Oct. 21, 1969     R. R. DAVIDSON     3,473,476

GEAR PUMP SEAL

Filed Nov. 13, 1967     2 Sheets-Sheet 1

INVENTOR.
ROBERT R. DAVIDSON
BY Bosworth, Sessions,
Henstrom & Cain
ATTORNEYS

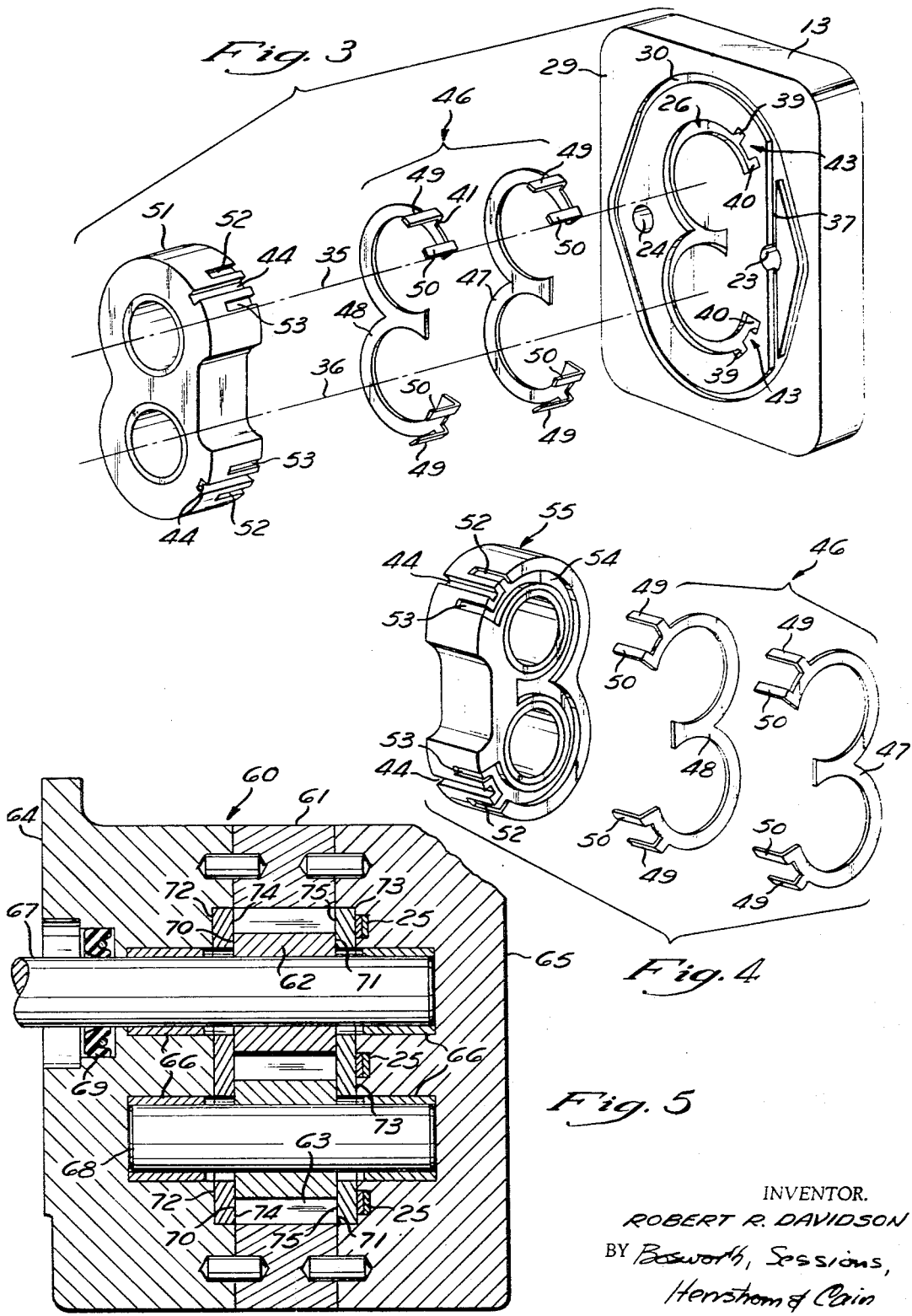

United States Patent Office 3,473,476
Patented Oct. 21, 1969

3,473,476
GEAR PUMP SEAL
Robert R. Davidson, South Amherst, Ohio, assignor to Lear Siegler, Inc., Santa Monica, Calif., a corporation of Delaware
Filed Nov. 13, 1967, Ser. No. 682,281
Int. Cl. F04c 1/04; F04b 21/08
U.S. Cl. 103—126                                                                    12 Claims

ABSTRACT OF THE DISCLOSURE

A pressure-loaded hydraulic gear pump or motor having means for creating a balance of hydraulic forces on the gears in an axial plane and including means for flushing contaminants from pressure-balancing areas.

BACKGROUND OF THE INVENTION

This invention relates to pressure-loaded hydraulic gear pumps or motors. In connection with such deivces, the problems of design and operation are similar for motors and for pumps and the invention described herein is useful with both motors and pumps. For convenience, however, the invention is described below with reference to a pump.

Conventional rotary gear pumps employ a pair of meshing gears in a shaped chamber of a pump housing. In operation, the two gears produce high and low pressure areas and a distributed pressure gradient area between them within the housing chamber. The fluid passing through the pump is confined between the axially spaced side faces of the meshing gears by pump pressure sealing means having planar side walls bearing against the side faces of the rotating gears. This invention is concerned with pump pressure sealing means of the floating type which have a limited amount of freedom to move axially and laterally to maintain alignment with the gear axes and surface engagement with the side faces. Conventionally, the sealing means on at least one side of the gears is pressure loaded against the gear faces; i.e., urged against the faces of the gears by some pressure or pressures generated within the pump during operation and/or by mechanical loading. Such sealing means may comprise, for example, pressure plates or end faces of bearing blocks functioning as pressure plates and rotatable mounting and support for the gear shafts. For clarity and brevity, "pressure plate" is used in the following description and claims of this invention as a generic term intended to comprehend any floating pump pressure sealing means, including journal bearing blocks.

The principal problems of design and operation of such pumps stem from the different pressures present in the housing chamber during their operation. These pressure differences produce unbalanced forces on the gears and the pressure plate or plates. This produces increases wear and leakage beside the gears which shortens pump life, increases maintenance costs, and reduces efficiency. The pressure difference also tend to drive and wedge contaminant and foreign matter between the peripheral surfaces of the pressure plate and the housing cavity in which they are fitted, reducing or preventing a desirable amount of relative movement between them to the detriment of pump operation and life.

SUMMARY OF THE INVENTION

The improvement of the invention comprises a novel pressure-loading seal located between at least one of the pressure plates and the adjacent wall of the chamber housing and on one or both sides of the gear. The pressure-loading seal divides those peripheral areas of its adjacent pressure plate which are generally axially opposite the teeth of the meshing gears into pressure zones. The pressure zones so provided are placed in communication with pressures selected from the pressure gradient distribution present in the housing chamber by means of channels or passages extending between the opposite side faces of the pressure plate. In this manner, the pressures acting on opposite sides of the pressure plate or plates can be balanced or selectively unbalanced, as desired, at each pressure zone. As many difference pump pressure zone as are desirable of economical may be provided. The invention contemplates a high and a low pressure zone corresponding to discharge and inlet pressures and at least one intermediate pressure zone supplied through a suitable passage with pressure from the pressure gradient distribution at a level somewhere between inlet and discharge pressures.

In addition, the invention comprehends that the channel means or pressure communicating passages referred to above extending between the opposite side faces of a pressure plate may be so located that they perform another function. In this case, one end of each channel is opened into one of the pressure zones defined by the pressure-loading seal referred to above. The other end of each channel is located on the axially opposite side of the pressure plate and opens onto side faces of the teeth of one of the gears so that gear teeth and the spaces between gear teeth alternately pass by the channel entrance during operation of the pump. A higher pressure zone from the pressure gradient may be placed in communication with a lower pressure zone or an isolated pressure zone. In the first case, pulsating unidirectional pressure is provided for flushing contaminants and material that would otherwise collect behind the pump pressure sealing means and the housing wall. When feeding into an isolated pressure zone, the passing gear teeth produce a bidirectional flow in which fluid is pushed into and drawn out of the channel to provide the flushing action.

This invention provides a pressure-balanced and self-cleaning and self-lubricating gear pump which permits low cost and high production methods of manufacture and which provides high performance and requires a minimum of maintenance.

BRIEF DESCRIPTION OF THE DRAWINGS

FIGURE 3 is an exploded perspective view of the end plate of the pump and bearing block shown in FIGURE 1 and a modified form of the pressure-loading seal shown in FIGURE 2;

FIGURE 4 is an exploded perspective view showing another modification of the pressure-loading seal and a cooperating bearing block comprehended by this invention; and FIGURE 5 is a sectional view of a rotary gear pump employing fixed bearings for the journal of the shafts of the meshing gears and having floating pressure plates and a pressure-loading seal comprehended by this invention.

DESCRIPTION OF EMBODIMENTS OF THE INVENTION

Figure 1:
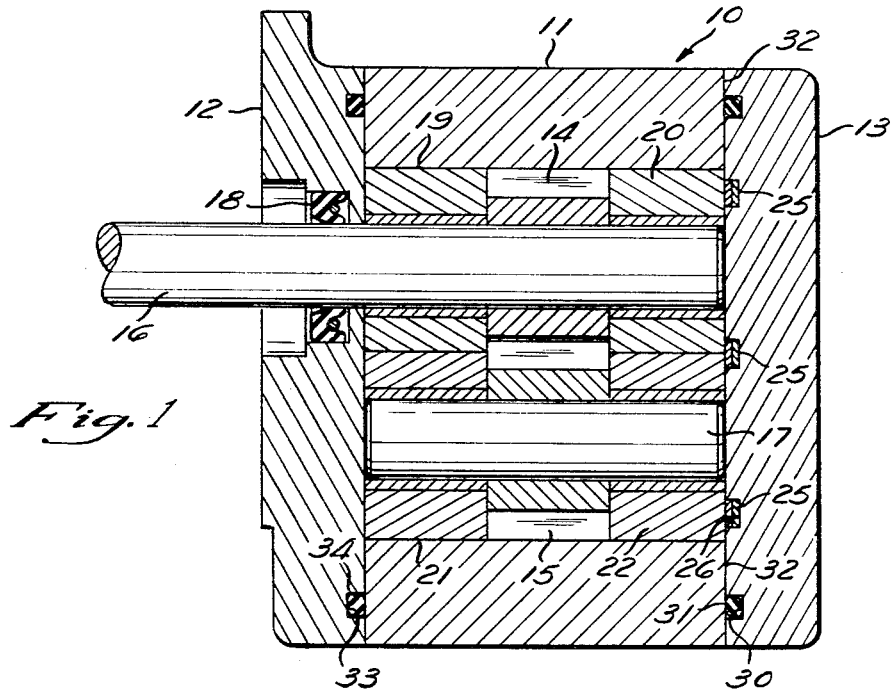
FIGURE 1 is a sectional view of a pressure-loading gear pump or motor taken in a plane containing the axes of rotation of the two gears and showing a preferred embodiment invention.

FIGURE 1 of the drawings shows a hydraulic gear pump embodying a preferred form of this invention and having a three-part housing indicated generally at 10 and consisting of a central section 11 and end plates or covers 12 and 13 located and fastened at the opposite ends of central section 11 by locating pins and bolts or other suitable means not shown in the drawings. The housing 10 forms a pump chamber containing a pair of meshing rotary gears 14 and 15 mounted on shafts 16 and 17, respectively, for rotation in journal bearing blocks 19, 20, 21, and 22. Shaft 16 of rotary gear 14 extends outwardly of the housing through end plate 12 and shaft seal 18 for connection to driving means. The bearing blocks are mounted on both sides of gears 14 and 15 and are preferably provided with a bushing of suitable material. The end faces of bearing blocks 19–22 have surface engagement with the side faces of gears 14 and 15 and serve as pump pressure sealing means tending to prevent the leakage of fluid around and along the side faces of rotary gears 14 and 15. In the pump of FIGURE 1, four separate bearing blocks are used. The two blocks on each side comprise a single unit. Bearing blocks 19–22 have limited freedom of axial and transverse movement adequate to permit them to maintain a coaxial relationship with shafts 16 and 17 and their end faces in surface engagement with the gear faces.

An inlet 23 and an outlet 24 enter housing 10 through end plate 13. These openings appear as ports in FIGURE 2. The ports communicate with passages in central section 11 of the housing which lead to the gears in a conventional manner.

Figure 2:
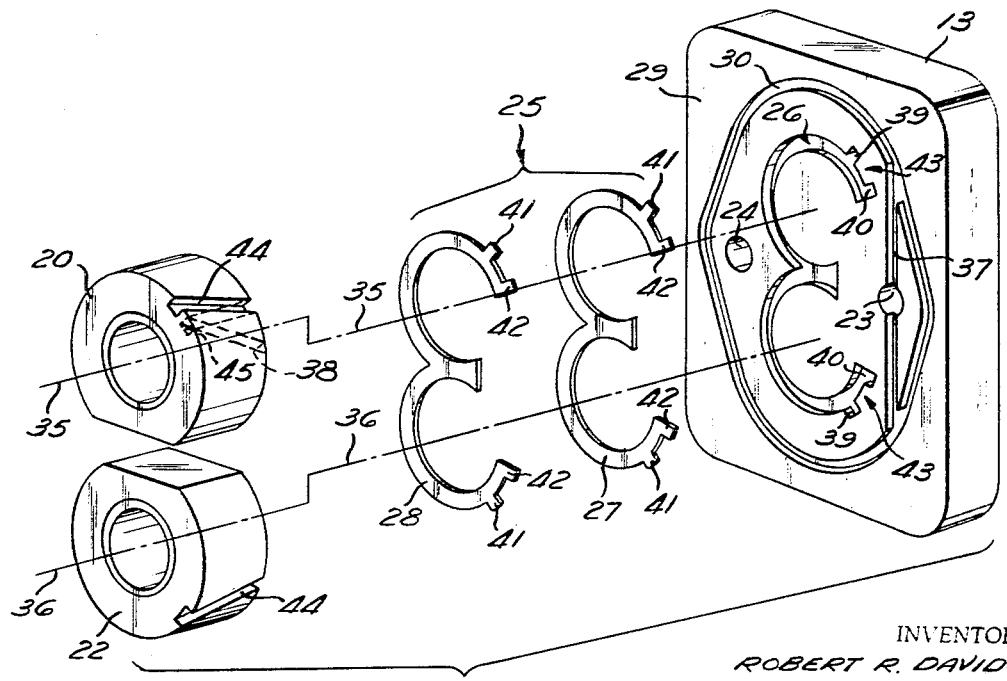
FIGURE 2 is an exploded perspective view of the end cover plate, the two-part pressure-loading seal and the journal bearing blocks of the pump shown in FIGURE 1.

In FIGURE 1, a pressure-loading seal indicated generally at 25 and comprising this invention is shown in cross section lying in a groove indicated generally at 26 in the inwardly facing surface of end plate 13. In FIGURE 2, pressure-loading seal 25 comprised of elements 27 and 28, end plate 13, and bearing blocks 20 and 22 is shown in exploded perspective to indicate the relationship of these elements more clearly than can be seen in FIGURE 1.

The inwardly facing surface 29 of end plates 13 contains a somewhat oval-shaped outer groove 30 for receiving an O-ring seal or other suitable seal means 31 for sealing the end plate to the end surface 32 of central housing section 11. Groove 30 is radially outside the interior chamber of housing 10 and tends to prevent the escape of fluid under pressure from between central section 11 and end plate 13. A similar groove 33, containing O-ring 34, is provided for sealing end plate 12 to central section 11. By centerlines 35 and 36, the axes of shafts 16 and 17 are located relative to the elements shown in FIGURE 2. Groove 30 in end plate 13 is provided with a pressure relief branch 37 which communicates with inlet port 23. Pressure relief branch 37 of groove 30 insures that pressure, and especially the high discharge pressure on the discharge side of the pump chamber, cannot build up in groove 30.

During pump operation, a pressure difference and intervening gradient is developed in the pump chamber between its inlet or low pressure side and its outlet or discharge side or areas. Fluid discharge pressure tends to work its way around the outer periphery of the two meshing gears counter to their direction of rotation and location of the pressure gradient around the periphery of the gears varies with pump speed and viscosity of the fluid being pumped, for example. The same pressures and pressure gradient tend to force the pumped fluid along the side faces of the gears. This leakage is resisted by pump pressure sealing means which, in the pump shown in FIGURE 1, comprise bearing blocks.

End surface 29 is also provided with a groove having the general shape of a numeral "3" and indicated generally at 26. On the ends of its upper and lower circular sections as shown in FIGURE 2, there are provided a pair of circumferentially spaced, radially projecting grooves 39 and 40. Groove 26 corresponds in shape to and is intended to receive pressure-loading seal 25.

Pressure-loading seal 25 in the embodiment shown in FIGURE 2 is comprised of two elements, each having the same shape and adapted to be superimposed within groove 26. Radial projections 41 and 42 on seal 25 correspond to projections 39 and 40, respectively, of groove 26. The element 27, lying in the bottom of the groove, is preferably made of a material having resilient properties, such as rubber. Element 28, lying on top of resilient element 27 and having engagement with the adjacent end faces of bearing blocks 20 and 22, is preferably formed of a material having high wear resistance, such as the material sold by The Polymer Corp. under the trademark "Nylatron."

Pressure-loading seal 25 in its groove 26 of end plate 13 serves to confine discharge pressure radially away from the shafts of gears 14 and 15 and generally in an area axially opposite the gear teeth. Radial projections 41 and 42 of pressure-loading seal 25 divide the peripheral area axially opposite the gear teeth into pressure zones. For example, pressure from the high pressure area at discharge or outlet side of the pump is prevented by radial projections 41 of pressure-loading seal 25 from advancing about the periphery to the low pressure area at the pump inlet. Inlet pressure is confined to the area adjacent inlet 23 by projecting portions 42 of seal 25.

An intermediate pressure zone indicated generally at 43 is present between radial projections 41 and 43 of pressure-loading seal 25. Intermediate zone 43 is isolated from inlet and discharge pressures of the adjacent areas and is provided with its own pressure by means of channels 44 in bearing blocks 20 and 22 as shown in FIGURE 2. Channels 44 are preferably in the peripheral surface of channel bearing blocks as shown and axially opposite the teeth portions of gears 14 and 15. They are located along the peripherally distributed pressure gradient in the housing chamber so as to provide a preselected pressure from the gradient for transmission to the intermediate zone 43. As shown in FIGURE 2, channels 44 preferably extend non-axially or at an angle to the axis of bearing blocks 20 and 22 and provide the intermediate zones 43 with a slightly higher gradient pressure than that present at a point axially opposite the intermediate pressure zone. Alternatively, this invention comprehends directing the channels axially in the periphery of the bearing blocks in the manner indicated in broken outline at 45 in FIGURE 2 so as to connect the intermediate zones 43 with the pressure gradient present at a point axially opposite them.

Pressure-loading seal 25 as described above permits selected placement and distribution of balancing fluid pressures on the bearing blocks in opposition to the pattern of fluid pressures generated in the housing chamber during pump operation. The particular balancing pressures desired can be varied in number and location by a pressure-loading seal and seal-receiving groove of suitable configuration and by appropriately directed pressure-communicating channels such as channels 44 and 45. For example, pressure-loading seal 25 may be provided with additional radial projection spaced circumferentially between seal projections 41 and 42 to form two intermediate pressure zones in the place of each zone 43. The pressures desired within the pressure zones defined by the pressure-loading seal are determined by the direction of the pressure-communicating channels connecting each zone with a selected pressure at the gear faces. As operating pressures in the pump chamber vary with operating conditions, the balancing pressures also vary in direct relation thereto so that the desired balance is always maintained. The discharge, inlet, and gradient pressures acting on the gear face end of the bearing blocks can be effectively balanced and/or opposed at all operating conditions by axially opposite areas of like pressures so that the bearing blocks are maintained in square engagement with the gear faces and the bushings coaxial with the journals of the gear shafts.

In addition to providing the intermediate zone between the bearing block and the end plate with a loading and balancing pressure preselected from the pressure gradient distribution, channel 44 serves as a flushing passage for keeping the clearances between the journal bearing blocks and the adjacent peripheral walls of the housing chamber free of accumulations of foreign matter and contaminants that tend to be driven and wedged therebetween by the pressure gradient in the pump chamber. The flushing is accomplished by channel 44 in the peripheral clearance surface of the bearing blocks. Foreign matter and contaminants from the clearances between the peripheral surfaces of the bearing blocks and the bores in the housing holding them are drawn into channel 44 by transient pressure changes and pulsations produced by the alternate passing of the gear teeth and the spaces between the gear teeth past one of the channels. If the foreign matter and contaminants are not removed from the peripheral clearances, the bearing blocks can become stuck and unable to maintain their engagement with the side faces of the gears and coaxial relationship with the journals of the gear shaft. This feature of the invention thus contributes substantially to the reduced wear and increased efficiency in pump operation. The same advantageous result is obtained with axially directed channel 45 when used in lieu of non-axial channel 44.

Pressure transmitting channels may also be used with advantage between zones of higher pressure and unisolated zones of lower pressure. For example, channel 38 shown in dotted outline on bearing block 20 of FIGURE 2 extends non-axially from the pressure gradient zone on that side of the bearing block which faces the gear to the low and unisolated pressure or inlet pressure zone defined by pressure seal 25 on the seal side of bearing block 20. The skew or angled direction of passage 38 takes it from a low positive pressure in the gradient zone on the gear side circumferentially across leg 42 of seal 25 to the unisolated inlet pressure zone, so that a slight pressure difference always exists and tends to push fluid through channel 38 for flushing contaminants and other matter from between the peripheral surface of the bearing blocks and the housing surface adjacent thereto. The pressure varies with pump speed, of course, and the range of pressures provided the passage can be selected by choice of the point in the gradient zone tapped by the channel. The flow of fluid in passage 38 is generally toward the inlet pressure zone, though it pulsates somewhat with the passage of the gear teeth and the spaces between them past the gear face end of the passage. Flow is not in both directions, however, as when the pressure passage communicates with an isolated pressure zone in which pressures build up to levels alternately greater and less than the pulsating pressure delivered to the channel.

A modified form of pressure-loading seal 46 is shown in FIGURE 3. This form and the elements of its environment as shown in FIGURE 3 have counterparts in FIGURE 2 and are identified by the same reference numerals. End plate 13 and seal-receiving grooves 30 and 26 are similar to those shown in FIGURE 2; however, resilient and wear-resistant elements 47 and 48, respectively, of modified seal 46 differ from the corresponding elements of seal 25 of FIGURE 2 in that the radial projections 41 and 42 on the modified seal elements 47 and 48 are provided with axially extending legs 49 and 50, respectively, connected to and projecting from them. Extension in an axial direction of projections 41 and 42 serves to enhance the isolation of intermediate pressure zone 43 from adjacent pressures. In this manner, intermediate pressure zone 43 tends to be extended onto and along the peripheral surface of the bearing blocks from between the bearing block surface axially away from the gear face and the adjacent wall of the pump chamber formed by the end plate.

In FIGURE 3, a single-piece form of bearing block is shown and identified generally as 51. It is provided with seal-receiving grooves 52 and 53 for legs 49 and 50, respectively, of seal 46. Grooves 52 and 53 extend generally axially to a point short of the bearing block surface engaging the side faces of the gears, and are located on opposite sides of pressure-communicating channels 44.

Pressure-loading seal 23 and modified pressure-loading seal 46 comprising an element of this invention can function as intended in a groove 54 similar to groove 38 in end plate 13 and located in the face of bearing block 55 as shown, for example, in FIGURE 4. The radially extending projections of groove 54 join the ends of axially extending seal-receiving grooves 52 and 53. Though not shown, axially extending grooves corresponding to grooves 52 and 53 can be provided in the housing walls adjacent the peripheral surfaces of the bearing block.

Although not shown, it will be understood that a pressure-loading seal of the forms shown can be received within an appropriate groove formed in the adjacent faces of both the end plate and the bearing blocks.

FIGURE 5 shows another conventional form of rotary gear pump. The housing indicated generally at 60 is provided with a central section 61 having an axial thickness corresponding to the axial thickness of gears 62 and 63 confined therein. End plates 64 and 65 complete housing 60 and are provided with suitable bores and bushings 66 to support the journals of shafts 67 and 68 of gears 62 and 63 for rotation in the interior chamber of the housing. Shaft 67 extends through the end plate 64 and a shaft seal 69 provided therein. Pump pressure is sealed and confined between the axially spaced apart side faces 70 and 71 of the gears by floating pressure plates 72 and 73, each having a planar surface 74 and 75, respectively, lying against side faces 70 and 71 of the gears. Pressure plates 72 and 73 have the same general outline as singlepiece bearing block 55, for example, but they are not as thick axially and do not support and bear the journals of shafts 67 and 68.

The pressure-loading seal element 25 of this invention as described above is carried in a groove in end plate 65 in the same manner as shown in FIGURE 2 in connection with end plate 13. Seal 25 in FIGURE 5 defines a high, a low, and an intermediate pressure zone between pressure plate 73 and end cover 65. A suitable pressure-transmitting channel, similar to channel 44 in the bearing blocks of FIGURE 2, is appropriately located in the peripheral surface of pressure plate 73 to provide the intermediate zone with selected pressure from the peripherally-distributed pressure gradient present during pump operation. The pressure-transmitting groove also serves to flush foreign matter and contaminants from the peripheral clearances of pressure plate 73 in the same manner as described above in connection with FIGURES 1 and 2.

From the foregoing, it will be apparent that this invention provides sealing means for dividing the space behind the pressure-retaining means in a rotary gear pump into a number of pressure zones and for isolating a discharge pressure zone and an inlet pressure zone. Further, intermediate and isolated pressure zones may be provided by the particular forms and structures of pressure sealing means described above and shown in the drawings, which zones may be provided with predetermined pressure levels from the pressure gradient areas of the pump chamber. Such isolated pressure zones may also be provided by various sealing means other than the structures shown. For example, a simple ring of resilient material set in a suitable channel in the pressure-retaining means and/or the adjacent surface of the pump end plate provides an isolated zone comprehended by this invention. An isolated intermediate pressure zone such as provided by a ring or other sealing means can be maintained at a predetermined pressure by a pressure-communicating passage extending in the pressure-retaining means from the isolated zone to a point within the pump chamber having the desired pressure.

In all the forms of this invention shown and described above, the pressure-transmitting channels for providing selected pressures to the pressure zones formed by the seal element may be a hole or passage extending generally axially or non-axially through the pump pressure sealing means, such as bearing blocks or pressure plates, between the axial end faces. Since such a passage would not communicate with the same peripheral surfaces as channels 44, for example, the same flushing action of contaminants from the peripheral clearances would not be enjoyed.

Pumps embodying this invention have been designed for use in industrial hydraulic fluid systems such as employed on tractors to operate front-end loaders and back hoes and on lift trucks. The duty might vary from pumps having capacities of from one-half to one hundred gallons per minute, and operated at speeds of 2000 r.p.m. and at pressures up to 3000 p.s.i. Such applications are merely examples and are not intended to indicate any limitations.

Those skilled in the art will appreciate that various other changes and modifications can be made in the preferred form of apparatus described herein without departing from the spirit and scope of the invention.

I claim:
1. In a hydraulic pump or motor including:
a housing,
an interior chamber in the housing having
an inlet and
an outlet and
a high pressure area, an intermediate area of gradient pressures, and a low pressure area, and containing;
intermeshing rotary gears having pairs of axially spaced side faces, and
pressure-retaining means lying between each side face and the chamber wall adjacent thereto for confining between said axially spaced side faces of said gears the hydraulic fluid passing through said pressure areas of said chamber from the inlet to the outlet,
the improvement comprising
sealing means between at least one of said pressure-retaining means and the adjacent chamber wall for defining pressure zones therebetween including at least
a high pressure zone in communication with said outlet, and
a low pressure zone in communication with said inlet, and
pressure communicating means for interconnecting at least one of said pressure zones and a selected one of said gradient pressures from said intermediate area of the interior pump chamber.

2. In a hydraulic pump or motor including:
a housing,
an interior chamber in the housing having;
an inlet and
an outlet and
high, intermediate, and low pressure areas, and containing
intermeshing rotary gears having pairs of axially spaced side faces, and
pressure-retaining means lying between each side face and the chamber wall adjacent thereto for confining between said axially spaced side faces of said gears the hydraulic fluid passing through said pressure areas of said chamber from the inlet to the outlet,
the improvement comprising
sealing means between at least one of said pressure-retaining means and the adjacent chamber wall for defining pressure zones therebetween including at least
a high pressure zone, and
a low pressure zone, and
pressure communicating means for interconnecting at least one of said pressure zones and a selected one of said pressure areas of the interior pump chamber, said pressure communicating means comprising a channel in the radially outer peripheral surfaces of said pressure-retaining means and in communication with the peripheral clearances between said pressure-retaining means and the adjacent chamber wall and extending non-axially between and connecting the opposite side faces of said pressure-retaining means.

3. In a hydraulic pump or motor including:
a housing,
an interior chamber in the housing having
an inlet and
an outlet and
high, intermediate, and low pressure areas, and containing
intermeshing rotary gears having pairs of axially spaced side faces, and
pressure-retaining means lying between each side face and the chamber wall adjacent thereto for confining between said axially spaced side faces of said gears the hydraulic fluid passing through said pressure areas of said chamber from the inlet to the outlet,
the improvement comprising
sealing means between at least one of said pressure-retaining means and the adjacent chamber wall for defining pressure zones therebetween including at least
a high pressure zone, and
a low pressure zone, and
pressure communicating means for interconnecting at least one of said pressure zones and a selected one of said pressure areas of the interior pump chamber, said pressure communicating means comprising a channel in the radially outer peripheral surfaces of said pressure-retaining means and in communication wtih the peripheral clearances between said pressure-retaining means and the adjacent chamber wall and extending from an area of higher pressure to a zone of lower pressure.

4. In a hydraulic pump or motor including:
a housing,
an interior chamber in the housing having
an inlet and
an outlet and
a high pressure area, an intermediate area of gradient pressures, and a low pressure area, and containing
intermeshing rotary gears having pairs of axially spaced side faces, and
pressure-retaining means lying between each side face and the chamber wall adjacent thereto for confining between said axially spaced side faces of said gears the hydraulic fluid passing through said pressure areas of said chamber from the inlet to the outlet,
the improvement comprising
sealing means between at least one of said pressure-retaining means and the adjacent chamber wall for defining pressure zones therebetween including a high pressure zone in communication with said outlet, a low pressure zone in communication with said inlet, and at least one intermediate pressure zone, and
pressure communicating means for interconnecting at least said one intermediate pressure zone and only one of said gradient pressures of said intermediate area, said gradient pressure being selected from all gradient pressures in said intermediate area not less than any of the pressure levels of the pressure area axially opposite said intermediate pressure zone.

5. In a hydraulic pump or motor including:
a housing,
an interior chamber in the housing having
an inlet and an outlet and
high, intermediate, and low pressure areas, and containing
intermeshing rotary gears having pairs of axially spaced side faces, and
pressure-retaining means lying between each side face and the chamber wall adjacent thereto for confining between said axially spaced side faces of said gears the hydraulic fluid passing through said pressure areas of said chamber from the inlet to the outlet,
the improvement comprising
sealing means between at least one of said pressure-retaining means and the adjacent chamber wall for defining pressure zones therebetween including:
a high pressure zone,
a low pressure zone, and
at least one intermediate pressure zone, and
pressure communicating means for interconnecting each of said pressure zones and selected ones of said pressure area of the interior pump chamber,
said sealing means having a general plan outline suggestive of the figure 3 with the circular portions corresponding to and lying axially opposite the teeth of said intermeshing gears and the open side of the figure adjacent the inlet or low pressure area of the pump and the closed side adjacent the outlet or discharge pressure area of the pump, said sealing means also having at least two projections circumferentially spaced and extending radially outwardly in plan from each of said circular portions to a point generally axially opposite the periphery of said gears to isolate between said pressure-retaining means and the adjacent chamber wall pressures from said high and low areas and to provide circumferentially between adjacent ones of said projections an isolated zone of pressure, and in which said pressure communicating means comprises a channel extending and providing communication between said isolated zone of pressure and a selected one of said pressure areas in said interior chambers.

6. The apparatus according to claim 5 in which said pressure communicating means comprises channels in the radially outer peripheral surfaces of said pressure-retaining means and in communication with the peripheral clearances between said pressure-retaining means and the adjacent chamber wall.

7. The apparatus according to claim 6 in which said channels extend generally axially between and connect the opposite side faces of said pressure-retaining means.

8. In a hydraulic pump or motor including:
a housing,
an interior chamber in the housing having
an inlet and
an outlet and
high, intermediate, and low pressure areas, and containing
intermeshing rotary gears having pairs of axially spaced side faces, and
pressure-retaining means lying between each side face and the chamber wall adjacent thereto for confining between said axially spaced side faces of said gears the hydraulic fluid passing through said pressure areas of said chamber from the inlet to the outlet,
the improvement comprising
sealing means between at least one of said pressure-retaining means and the adjacent chamber wall for defining pressure zones therebetween including a high pressure zone, a low pressure zone, and at least one intermediate zone, and
pressure communicating means for interconnecting each of said pressure zones and selected ones of said pressure areas of the interior pump chamber, said pressure communicating means comprising channels in the radially outer peripheral surfaces of said pressure-retaining means and in communication with the peripheral clearances between said pressure-retaining means and the adjacent chamber wall and extending non-axially between and connect the opposite side faces of said pressure-retaining means.

9. The apparatus according to claim 5 in which said radial projections of said sealing means each terminate in axial legs extending in the peripheral clearances between said pressure-retaining means and the adjacent chamber wall.

10. The apparatus according to claim 6 in which said channels each have one end opening axially opposite the radially outer and toothed portion of said gears.

11. The apparatus according to claim 5 in which said sealing means between said pressure-retaining means and the adjacent chamber wall comprises a seal-receiving groove in one and a seal seated in and bearing in sealing engagement against the other.

12. The apparatus according to claim 11 in which said seal comprises a first resilient element tending to urge said seal out of said seal-receiving groove and against the surface adjacent thereto and having a second wear-resistant element superimposed on said first element and having sealing engagement with the adjacent surface.

References Cited

UNITED STATES PATENTS

| | | |
|---|---|---|
| 2,707,441 | 5/1955 | Drennen. |
| 2,714,856 | 8/1955 | Kane. |
| 2,809,592 | 10/1957 | Miller et al. |
| 3,096,719 | 7/1963 | McAlvay. |
| 3,174,435 | 3/1965 | Sisson et al. |
| 3,348,492 | 10/1967 | Olson et al. |

DONLEY J. STOCKING, Primary Examiner

W. J. GOODLIN, Assistant Examiner

U.S. Cl. X.R.

103—216